(12) United States Patent
McNerney et al.

(10) Patent No.: US 6,676,024 B1
(45) Date of Patent: Jan. 13, 2004

(54) THERMOSTATIC VALVE WITH ELECTRONIC CONTROL

(75) Inventors: Gerald Joseph McNerney, Carmel, IN (US); Garry R. Marty, Fishers, IN (US)

(73) Assignee: Masco Corporation, Taylor, MI (US)

( * ) Notice: Subject to any disclaimer, the term of this patent is extended or adjusted under 35 U.S.C. 154(b) by 0 days.

(21) Appl. No.: 10/235,057

(22) Filed: Sep. 5, 2002

(51) Int. Cl.$^7$ ............................................... G05D 23/12
(52) U.S. Cl. ........................................ 236/12.12; 4/676
(58) Field of Search .................. 4/676, 677; 236/12.12

(56) References Cited

U.S. PATENT DOCUMENTS

| | | | |
|---|---|---|---|
| 3,721,386 A | * | 3/1973 | Brick et al. ............... 236/12.12 |
| 4,458,839 A | | 7/1984 | MacDonald |
| 4,528,709 A | * | 7/1985 | Getz et al. ...................... 8/158 |
| 4,640,457 A | | 2/1987 | MacDonald |
| 4,699,172 A | | 10/1987 | MacDonald |
| 4,700,885 A | | 10/1987 | Knebel |
| 4,711,392 A | | 12/1987 | Kidouchi et al. |
| 4,738,393 A | | 4/1988 | Bergmann et al. |
| 4,760,953 A | | 8/1988 | Trubert |
| 4,767,052 A | | 8/1988 | Kostorz et al. |
| 4,819,867 A | | 4/1989 | Delpla et al. |
| 4,863,097 A | | 9/1989 | Avelov |
| 4,875,623 A | * | 10/1989 | Garris ...................... 236/12.12 |
| 4,901,750 A | | 2/1990 | Nicklas et al. |
| 4,905,732 A | | 3/1990 | Bright et al. |
| 4,915,295 A | | 4/1990 | Pullen et al. |
| 4,976,460 A | | 12/1990 | Newcombe et al. |
| 4,978,059 A | | 12/1990 | Nicklas et al. |
| 4,981,156 A | | 1/1991 | Nicklas et al. |
| 5,050,062 A | | 9/1991 | Hass |
| 5,067,513 A | | 11/1991 | Nicklas et al. |
| 5,102,039 A | | 4/1992 | Yothers |
| 5,110,045 A | | 5/1992 | Glasson et al. |
| 5,129,576 A | | 7/1992 | Pullen et al. |
| 5,148,976 A | | 9/1992 | Reid |
| 5,161,737 A | | 11/1992 | Olmsted et al. |
| 5,205,483 A | | 4/1993 | Kostorz |
| 5,230,465 A | | 7/1993 | Kostorz et al. |
| 5,242,108 A | | 9/1993 | Heimann et al. |
| 5,251,811 A | | 10/1993 | Frankholz |
| 5,320,137 A | | 6/1994 | Huang |
| 5,323,960 A | | 6/1994 | Kline |
| 5,340,018 A | | 8/1994 | MacDonald |
| 5,341,987 A | | 8/1994 | Ackroyd |
| 5,344,067 A | | 9/1994 | Axelsson et al. |
| 5,350,112 A | | 9/1994 | Stein |
| 5,356,074 A | | 10/1994 | Limet et al. |

(List continued on next page.)

FOREIGN PATENT DOCUMENTS

| | | |
|---|---|---|
| DE | 3425 892 A1 | 2/1985 |
| DE | 195 32 584 A1 | 3/1996 |
| EP | 0 973 083 A2 | 1/2000 |
| GB | 2 207 964 A | 2/1989 |
| GB | 2 268 249 A | 1/1994 |
| WO | WO 98/26339 | 6/1998 |
| WO | WO 00/14615 | 3/2000 |
| WO | WO 0052545 | 9/2000 |
| WO | WO 0122185 | 3/2001 |
| WO | WO 01/68754 A1 | 9/2001 |

*Primary Examiner*—William E. Tapolcai
(74) *Attorney, Agent, or Firm*—Carlson, Gaskey & Olds

(57) ABSTRACT

A thermostatic valve is controlled by a motor that receives signals from an electronic control module (ECM). The ECM sends an electric signal corresponding to a desired outlet stream temperature to the motor, which turns the thermostatic valve to a location corresponding to the desired temperature. The ECM also adapts the thermostatic valve capacity to outlet flow demands by restricting and opening inlet valves, ensuring that the thermostatic valve can maintain an equilibrium temperature for both high and low outlet flow applications.

24 Claims, 2 Drawing Sheets

U.S. PATENT DOCUMENTS

| | | |
|---|---|---|
| 5,370,305 A | 12/1994 | Schneider |
| 5,375,624 A | 12/1994 | Knapp |
| 5,379,936 A | 1/1995 | Kline |
| 5,400,961 A | 3/1995 | Tsutsui et al. |
| 5,425,394 A | 6/1995 | Clare |
| 5,427,312 A | 6/1995 | Simonov et al. |
| 5,433,378 A | 7/1995 | Orlandi |
| 5,452,740 A | 9/1995 | Bowman |
| 5,467,799 A | 11/1995 | Buccicone et al. |
| 5,505,225 A | 4/1996 | Niakan |
| 5,511,723 A | 4/1996 | Toshio et al. |
| 5,524,666 A | 6/1996 | Linn |
| 5,535,943 A | 7/1996 | Kahle et al. |
| 5,546,983 A | 8/1996 | Clare |
| 5,647,531 A | 7/1997 | Kline et al. |
| 5,709,339 A | 1/1998 | Bergmann |
| 5,779,139 A | 7/1998 | Ueno |
| 5,904,291 A | 5/1999 | Knapp |
| 5,927,597 A | 7/1999 | Bolgar et al. |
| 5,931,181 A | 8/1999 | Cook et al. |
| 5,931,374 A | 8/1999 | Knapp |
| 5,934,552 A | 8/1999 | Kalbacher et al. |
| 5,960,828 A | 10/1999 | Grohe et al. |
| 5,971,285 A | 10/1999 | Knapp |
| 5,979,777 A | 11/1999 | Ems |
| 6,021,952 A | 2/2000 | Antoniello et al. |
| 6,046,666 A | 4/2000 | Ingvarsson et al. |
| 6,050,285 A | 4/2000 | Goncze et al. |
| 6,059,193 A | 5/2000 | Braathen |
| 6,065,682 A | 5/2000 | Frunzetti |
| 6,079,625 A | 6/2000 | Lebkuchner |
| 6,085,984 A | 7/2000 | Chamot et al. |
| 6,089,462 A | 7/2000 | Osvaldo |
| 6,119,948 A * | 9/2000 | Spiegel et al. ............ 236/12.12 |
| 6,250,558 B1 * | 6/2001 | Dogre Cuevas ......... 236/12.12 |

* cited by examiner

THERMOSTATIC VALVE WITH ELECTRONIC CONTROL

TECHNICAL FIELD

The present invention relates generally to thermostatic valves, and more particularly to thermostatic valves that are electronically controlled.

BACKGROUND OF THE INVENTION

Currently used thermostatic valves control inlet temperatures of streams that are eventually output through a faucet, showerhead, or other outlet device. The thermostatic valve may, for example, adjust the amount of hot and cold water flowing to an outlet stream to compensate for changes in the inlet stream pressure and/or temperature, ensuring that the outlet stream temperature remains steady. Known high flow capacity valves can maintain an equilibrium temperature if pressure and/or temperature changes (e.g., those caused by a toilet flushing) occur at the inlet when carrying flow amounts near the upper capacity of the valve. However, the same high flow capacity valves have trouble maintaining an equilibrium outlet temperature when carrying flow amounts below the valve's capacity, such as in applications using only one showerhead, when pressure and/or temperature changes occur at the inlet.

Further, some thermostatic valves designed for high flow (e.g., more than 10 gallons per minute) applications tend to be unstable if used in low flow applications (e.g., less than 2.5 gallons per minute), causing the output temperature to oscillate by as much as 10–15° F. if sudden pressure reductions occur. Currently available thermostatic valves are designed to operate either in high outlet flow or low outlet flow environments, but there are no known thermostatic valves that can operate in different flow environments without a decrease in performance.

There is a desire for a thermostatic valve system that can maintain an equilibrium temperature during sudden pressure changes and that can perform acceptably in both low flow and high flow applications.

SUMMARY OF THE INVENTION

The present invention is directed to a system having an electronically-controlled thermostatic valve. An electronic control module (ECM) is connected to a motor that controls a thermostatic valve. The ECM sends an electric signal corresponding to a desired outlet stream temperature to the motor, which turns the thermostatic valve to a location approximately corresponding to the desired temperature. A temperature sensor disposed in the outlet stream may send a feedback signal to the ECM so that the ECM can adjust the motor, and therefore the thermostatic valves, to reach the desired temperature exactly.

In one embodiment, the system also includes inlet motors that control valves on the inlet supplies. If the ECM detects that the outlet flow demands of the system are lower than the thermostatic valve's capacity, the ECM can lower the valve capacity by restricting the valves on the inlet supplies via the inlet motors. By controlling the inlet flow, the system can vary the thermostatic valve capacity according to outlet flow demands to ensure that the valve can maintain an equilibrium temperature in the outlet stream even if there are sudden pressure changes within the system.

Electronically controlling a mechanically-operated thermostatic valve and incorporating inlet restrictions creates a variable-capacity thermostatic valve that operates acceptably in both low flow and high flow environments. Further, using an ECM-controlled thermostatic valve instead of more complicated electronic controllers keeps the system design simple and easy to service.

DETAILED DESCRIPTION OF THE EMBODIMENTS

Figure 1:
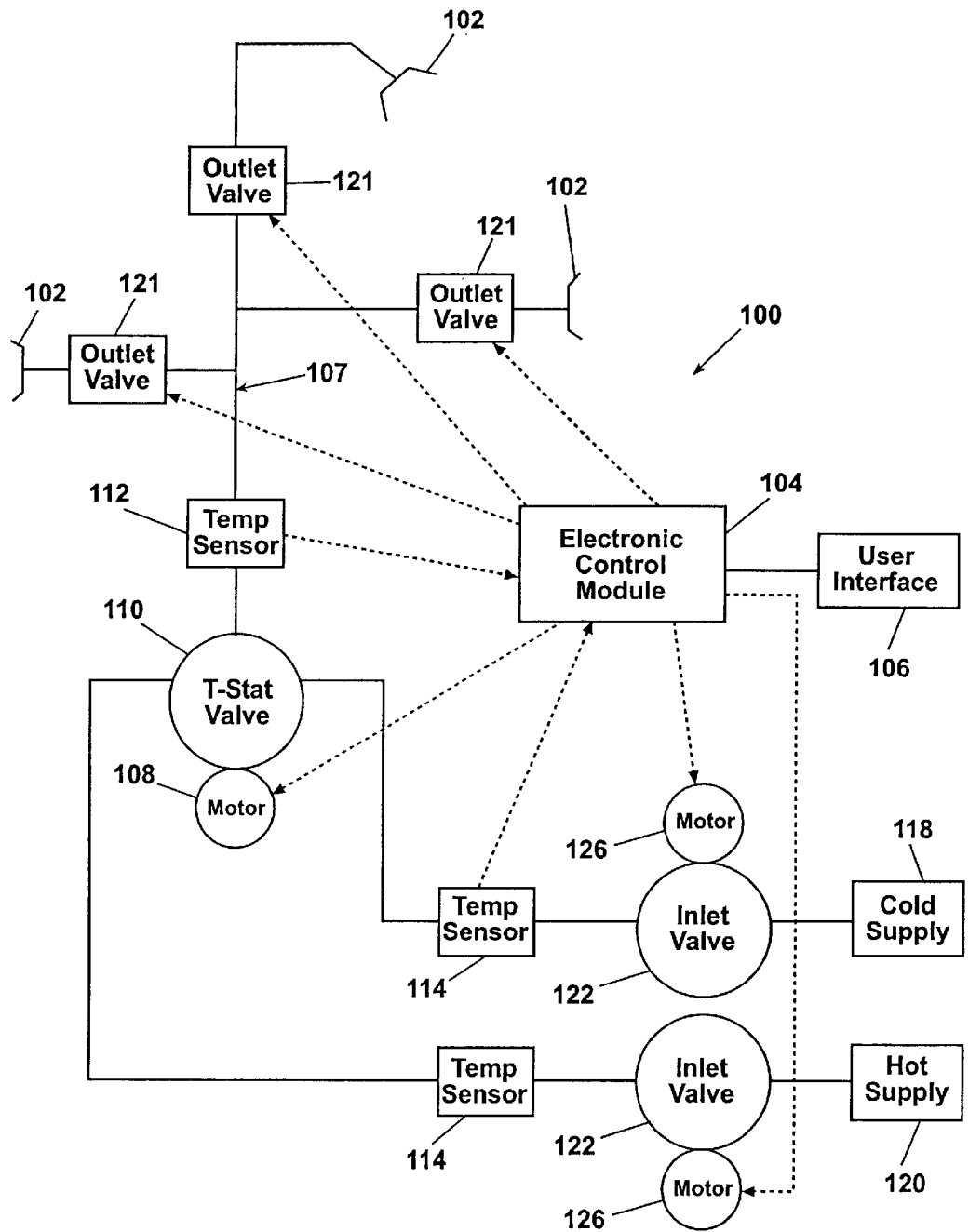
FIG. 1 is a block diagram of an electronically-controlled thermostatic valve system according to one embodiment of the invention.

FIG. 1 is a schematic block diagram illustrating one embodiment of a thermostatic valve system 100 according to one embodiment of the invention. The system 100 is designed to control fluid flow through one or more outlet devices 102, such as bodysprays, showerheads, etc. The system 100 includes an electronic control module (ECM) 104 that acts as a control point for the valve system's operations. Incorporating electronic control into a manual valve system 100 allows rapid, precise control over water temperature as well as water flow, ensuring that the system 100 maintains equilibrium temperature and pressure even if there are sudden pressure changes.

The ECM 104 itself can be any known pre-programmable circuit powered via a battery or a hardwired power connection. A user interface 106 may be coupled to the ECM 104 to allow a user to specify a temperature, select outlets to use, turn outlet valves on and off, and otherwise control the valve system 100 operation. The user interface 106 itself may be located in the shower or bath area and include, for example, a waterproof face, digital display, indicator lights, and user controls such as buttons or switches. In one embodiment, the digital display shows the temperature of an output stream 107 and the user controls. For example, actuating a particular user control may send a user input signal to the ECM 104 instructing the ECM 104 open or close an outlet 102, adjust outlet stream temperature, or otherwise control the outlet flow in any desired manner.

In one embodiment, the ECM 104 carries out three functions: controlling water temperature, diverting water to selected outlets, and varying inlet flow. Each of these functions will be described in greater detail below with respect to FIGS. 1 and 2.

For water temperature control, the ECM 104 is coupled to a valve actuation device, such as a motor 108, which is in turn connected to a thermostatic valve 110. The motor 108 can be any type of motor, such as a stepper motor, servo motor, or any other motor that can actuate a valve. The motor 108 turns the thermostatic valve 110 to a location corresponding to a thermostatic valve control signal received from the ECM 104. For example, if the user requests a water temperature of 100° F. via the user interface 106, the ECM 104 will send an electronic signal having a voltage level corresponding to the selected temperature to the motor 108. The motor 108 moves to a location corresponding to the electronic signal's voltage level, thereby turning a knob on the thermostatic valve 110 to a position corresponding with the selected temperature.

In one embodiment, the ECM 104 is pre-programmed with the approximate positions that the motor 108 should have to turn the thermostatic valve 110 to obtain given temperatures. In practice, however, thermostatic valves 110 tend to be inconsistent in delivering an output stream having a selected temperature. To provide additional temperature control, the system 100 may include an outlet temperature sensor 112, such as thermocouple or similar device, that sends a temperature signal back to the ECM 104 to form a feedback loop. The temperature signal is then processed by the ECM 104 and used to adjust the signal sent to the motor 108, thereby adjusting the thermostatic valve 110 and fine-tuning the outlet temperature as necessary. As a result, the ECM 104 and motor 108, along with feedback from the outlet temperature sensor 112, ensure that the water through the outlets 102 is the exact selected temperature.

To ensure further outlet temperature accuracy, the ECM 104 can be programmed so that it does not adjust the motor 108 until after the temperature of the inlet stream has stabilized. To control this, the system 100 may include inlet temperature sensors 114, one associated with a cold water supply 118 and one associated with a hot water supply 120. The ECM 104 monitors the inlet temperature sensors 114 and waits until the inlet temperature sensors 114 indicate that the inlet water temperatures have reached a stabilized condition before sending any signals to the motor 108 coupled to the thermostatic valve 110.

As noted above, the user interface 106 allows a user to turn selected outlets 102 on and off. In one embodiment, each outlet 102 includes an outlet valve 121 that can be turned on and off via an outlet valve control signal from the ECM 104, making the ECM 104 act as a diverter. For example, the outlet valves 121 can be solenoid valves 121 or any other on/off-type valve. In one embodiment, the outlet valves 121 are normally closed, opening only when they receive an electric signal from the. ECM 104.

The thermostatic valve 110 may also be used as a scald guard device, making internal adjustments so that pressure changes in the outlet stream 107 caused by, for example, a flushing toilet or an activated washing machine will not change the outlet temperature. Thermostatic valves designed with a high flow capacity, however, often cannot handle low flows (e.g., if the user selects an outlet 102 that demands a low flow amount) and therefore allow the temperature to oscillate. The system 100 maintains tight temperature control in these cases by incorporating inlet valves 122 having associated inlet motors 126. The inlet valves 122 may be any type of valve and are preferably variable control valves to allow optimum control over the thermostatic valve capacity. Like the motor 108 for the thermostatic valve 110, the inlet motors 126 receive electronic signals from the ECM 104 and control the positions of the inlet valves 122, thereby controlling the amount of water from each supply 118, 120 sent to the thermostatic valve 110. The inlet valves 122 themselves can be any type of valve, including valves that are infinitely adjustable as well as on/off-type valves (e.g., solenoid valves) that provide a specified restriction in a first position and allows full fluid flow in a second position.

To improve the performance of the system 100 at low flows, the ECM 104 can determine the outlet flow demand in the system 100 and then restrict or open the inlet valves 122, thereby reducing or increasing the valve capacity to match the outlet flow demand. The ECM 104 therefore can optimize the thermostatic valve 110 capacity so that it can maintain an equilibrium outlet temperature, regardless of the outlet flow demand.

The ECM 104 can detect the outlet flow demand through various methods. One option is to detect which outlets 102 are open and estimate the flow demanded by each open outlet 102. As noted above, the ECM 104 opens the outlet valves 121 via outlet valve control signals to the valves 121, so the ECM 104 can detect the open outlets 102 by simply identifying which outlet valves 121 have electronic signals being sent to them. The outlet flow demands for each individual outlet 102 are stored in the ECM 104. Once the open outlets 102 have been identified, the ECM 102 can calculate the outlet flow demand from the open outlets 102 and the stored outlet flow data. The ECM 104 can then adjust the inlet valves 122 via the inlet motors 126 to match the flow demand. If the user selects an outlet 102 combination demanding a low outlet flow, the ECM 104 can send inlet valve control signals to the inlet motors 126 to restrict the inlet valves 122 and reduce the thermostatic valve 110 capacity. Similarly, if the user selects an outlet 102 combination demanding a high outlet flow, the ECM 104 opens the inlet control valves 122 to increase the thermostatic valve 110 capacity.

Figure 2:
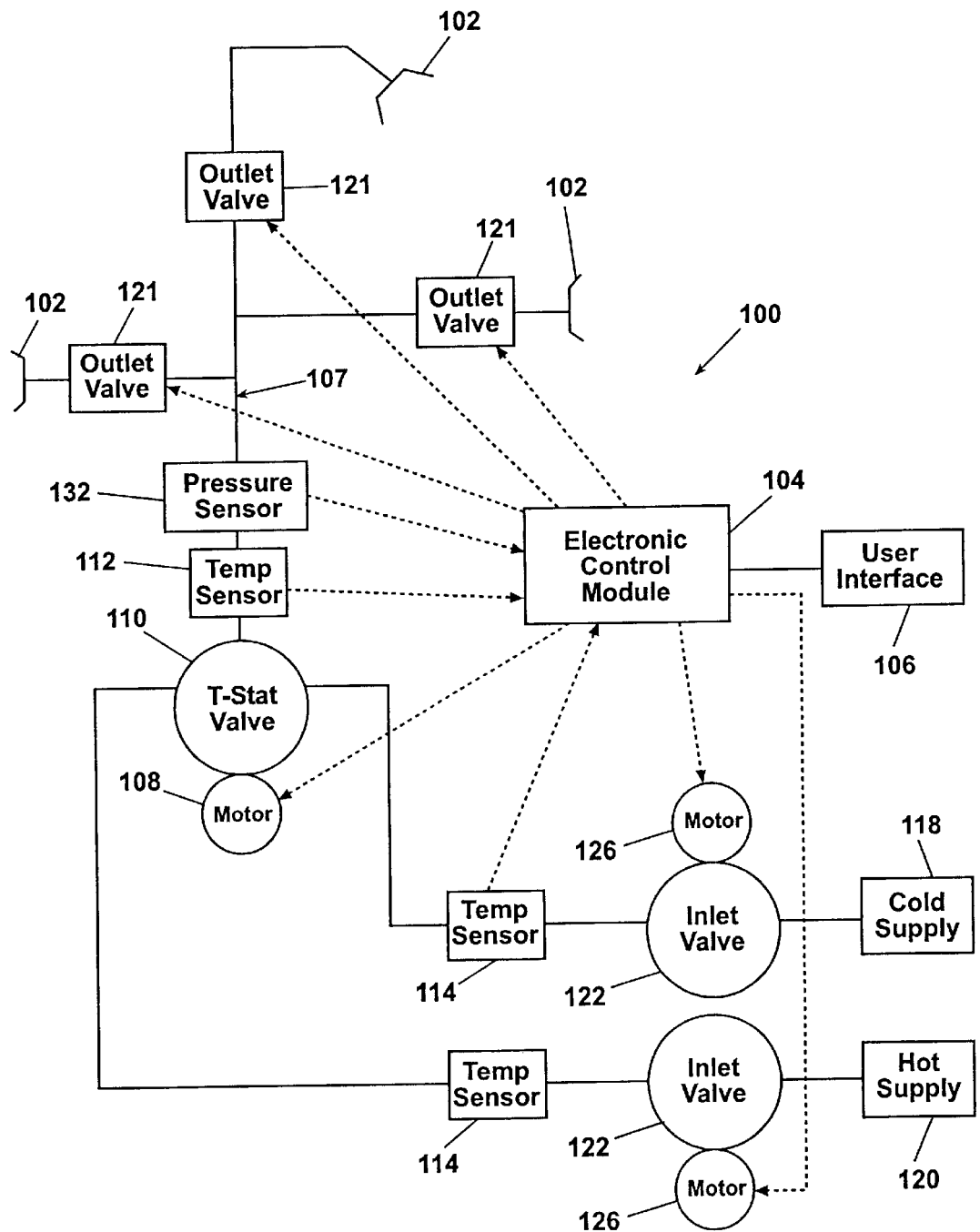
FIG. 2 is a block diagram an electronically-controlled thermostatic valve system according to another embodiment of the invention.

Another embodiment, illustrated in FIG. 2, places an outlet pressure sensor 132 in the outlet stream 107. The ECM 104 can then read the pressure sensor 132 to judge the total flow in the outlet stream 107 and then adjust the amount of restriction in the inlet valves 122 to correspond with the total flow. The specific degree of restriction in the inlet valves 122 for a given total flow amount can be stored in the ECM 104. This option provides greater flexibility than the option shown in FIG. 1 because the ECM 104 does not need to store data corresponding to individual outlets 102. Instead, the ECM 104 only needs to store data linking pressure sensor 132 readings with corresponding inlet valve 122, 124 restriction amounts. The data can be stored in the form of a look-up table in the ECM 104.

Regardless of the specific method used, the ECM 104 and inlet valves 122 provide consistent temperature control regardless of the outlet flow amount by modifying the inlet flow to match outlet flow demands. In essence, the system 100 creates a variable capacity thermostatic valve 110 that adapts to any outlet flow and maintains a desired equilibrium temperature at both high and low outlet flows without decreasing performance. Further, incorporating electronic control of a mechanical valve keeps the overall system design simple and preserves thermostatic valve performance even if the ECM 104 fails or if there is a power failure. In one embodiment, the thermostatic valve is a conventional thermostatic valve, which can be serviced by simply replacing a valve cartridge.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A fluid flow control system, comprising:
   a thermostatic valve;
   a valve actuation device connected to the thermostatic valve;
   an electronic control module connected to the valve actuation device, wherein the valve actuation device controls the thermostatic valve responsive to a thermostatic valve control signal from the electronic control module;
   a inlet valve; and
   an inlet valve actuation device coupled to said at least one inlet valve, wherein the inlet valve actuation device is responsive to an inlet valve control signal from the electronic control module.

2. The fluid flow control system of claim 1, wherein the valve actuation device is one selected from the group consisting of a stepper motor and a servo motor.

3. The fluid flow control system of claim 1, wherein the thermostatic valve control signal from the electronic control module corresponds to a selected temperature.

4. The fluid flow control system of claim 3, further comprising a temperature sensor disposed in an outlet stream and in communication with the electronic control module to form a feedback loop.

5. The fluid flow control system of claim 1, further comprising a pressure sensor disposed in an outlet stream and in communication with the electronic control module, wherein the electronic control module determines an outlet flow demand from the pressure sensor.

6. The fluid flow control system of claim 1, further comprising a user interface coupled to the electronic control module.

7. The fluid flow control system of claim 6, wherein the user interface comprises a display and at least one user control that sends a user input signal to the electronic control module.

8. The fluid flow control system of claim 1, wherein the inlet valve actuation device is an on/off-type valve that restricts fluid flow in a first position and allows fluid flow in a second position.

9. The fluid flow control system of claim 1, wherein the inlet valve actuation device is a motor.

10. The fluid flow control system of claim 1, further comprising at least one inlet temperature sensor in communication with the electronic control module, wherein the electronic control module detects a stabilized inlet stream condition from the inlet temperature sensor before sending the thermostatic valve control signal.

11. The fluid flow control system of claim 1, further comprising:
an outlet; and
an outlet valve associated with the outlet and in communication with the electronic control module, wherein the electronic control module controls the outlet valve via an outlet valve control signal.

12. A fluid flow control system, comprising:
a thermostatic valve;
a valve actuation device connected to the thermostatic valve;
an electronic control module connected to the valve actuation device, wherein the valve actuation device controls the thermostatic valve responsive to a thermostatic valve control signal from the electronic control module;
at least one outlet;
at least one outlet valve associated with said at least one outlet and in communication with the electronic control module, wherein the electronic control module controls at least one outlet valve via an outlet valve control signal;
at least one inlet valve; and
at least one inlet valve actuation device coupled to said at least one inlet valve, wherein the inlet valve actuation device is responsive to an inlet valve control signal from the electronic control module.

13. The fluid flow control system of claim 1, wherein the thermostatic valve control signal corresponds to a selected temperature and wherein the inlet valve control signal corresponds to an outlet flow demand.

14. The fluid flow control system of claim 1, wherein the electronic control module is programmed with a flow demand for each outlet and determines the outlet flow demand by detecting which outlet flow valves are receiving the outlet valve control signal.

15. The fluid flow control system of claim 13, further comprising a pressure sensor disposed in an outlet stream and in communication with the electronic control module, wherein the electronic control module determines the outlet flow demand from the pressure sensor.

16. The fluid flow control system of claim 12, wherein the valve actuation device and said at least one inlet valve actuation device are motors.

17. The fluid flow control system of claim 12, further comprising a temperature sensor disposed in an outlet stream and in communication with the electronic control module to form a feedback loop.

18. The fluid flow control system of claim 12, further comprising a user interface coupled to the electronic control module and having a display and at least one user control that sends a user input signal to the electronic control module.

19. The fluid flow control system of claim 12, further comprising at least one inlet temperature sensor in communication with the electronic control module, wherein the electronic control module detects a stabilized inlet stream condition from the inlet temperature sensor before sending the thermostatic valve control signal.

20. A method for controlling fluid flow, comprising:
determining a desired outlet stream temperature;
determining an outlet flow demand;
sending a thermostatic valve control signal corresponding to the desired outlet stream temperature to a valve actuation device;
generating an inlet valve control signal from the determined outlet flow; and
controlling a thermostatic valve via the valve actuation device according to the thermostatic valve control signal; and
controlling an inlet valve based on the inlet valve control signal.

21. The method of claim 20, wherein the controlling act comprises:
sending the inlet valve control signal to at least one inlet valve actuation device; and
controlling the inlet valve via the inlet valve actuation device according to the inlet valve control signal.

22. The method of claim 20, wherein the act of determining an outlet flow demand comprises:
detecting which of said at least one outlets is operational;
determining a flow demand for each operational outlet; and
calculating the outlet flow demand from a combination of the flow demands of each operational outlet.

23. The method of claim 20, wherein the act of determining an outlet flow comprises:
detecting a pressure in an outlet stream; and
calculating in outlet flow demand from the detected pressure.

24. The method of claim 20, further comprising:
receiving a user input signal from a user interface into the electronic control module; and
generating the thermostatic valve control signal based on the user input signal.

* * * * *

UNITED STATES PATENT AND TRADEMARK OFFICE
CERTIFICATE OF CORRECTION

PATENT NO. : 6,676,024 B1
DATED : January 13, 2004
INVENTOR(S) : McNerney et al.

It is certified that error appears in the above-identified patent and that said Letters Patent is hereby corrected as shown below:

Column 5,
Line 64, "claim 1" should read as -- claim 12 --

Column 6,
Line 1, "claim 1" should read as -- claim 13 --
Line 58, "in" should read as -- an --

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,676,024 B1
APPLICATION NO. : 10/235057
DATED : January 13, 2004
INVENTOR(S) : McNerney et al.

It is certified that error appears in the above-identified patent and that said Letters Patent is hereby corrected as shown below:

Column 5,
Line 64, "claim 1" should read as -- claim 12 --

Column 6,
Line 1, "claim 1" should read as -- claim 13 --
Line 58, "in" should read as -- an --

Signed and Sealed this

Twenty-seventh Day of March, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,676,024 B1 | Page 1 of 1 |
| APPLICATION NO. | : 10/235057 | |
| DATED | : January 13, 2004 | |
| INVENTOR(S) | : McNerney et al. | |

It is certified that error appears in the above-identified patent and that said Letters Patent is hereby corrected as shown below:

IN THE CLAIMS:

In Claim 13, Column 5, Line 64 of the patent, "claim 1" should read as --claim 12--

In Claim 14, Column 6, Line 1 of the patent, "claim 1" should read as --claim 13--

In Claim 23, Column 6, Line 58 of the patent, "in" should read as --an--

Signed and Sealed this

Twenty-second Day of May, 2007

JON W. DUDAS
*Director of the United States Patent and Trademark Office*